April 28, 1964
C. H. PHELPS
3,130,588
BALANCE TESTING APPARATUS
Filed Sept. 24, 1959
8 Sheets-Sheet 1
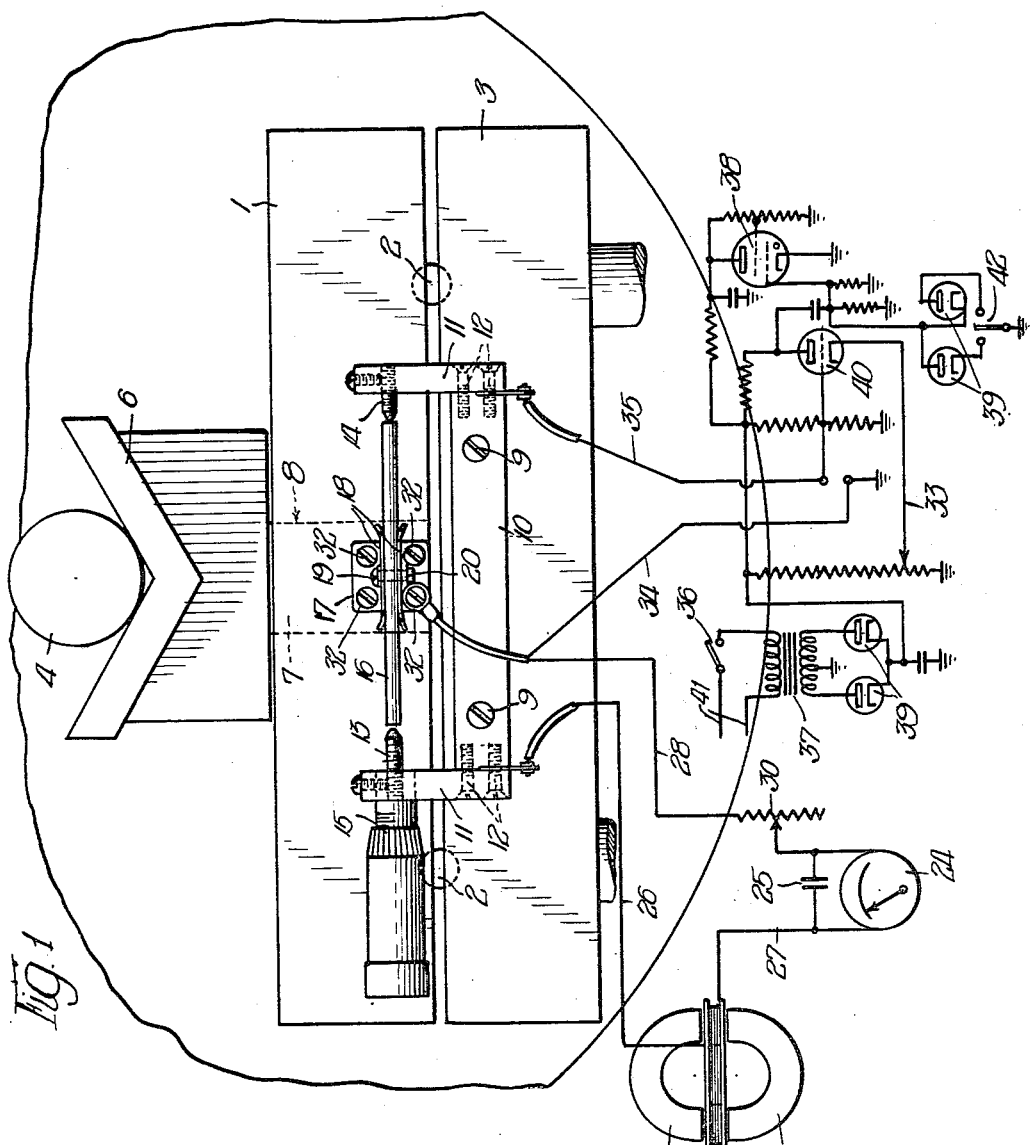
INVENTOR.
Clyde H. Phelps,
BY
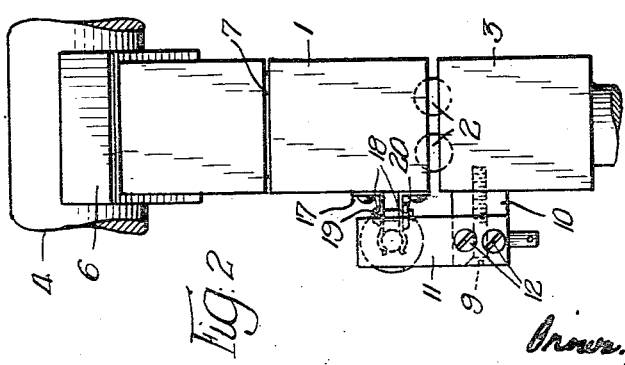

April 28, 1964
C. H. PHELPS
3,130,588
BALANCE TESTING APPARATUS
Filed Sept. 24, 1959
8 Sheets-Sheet 2
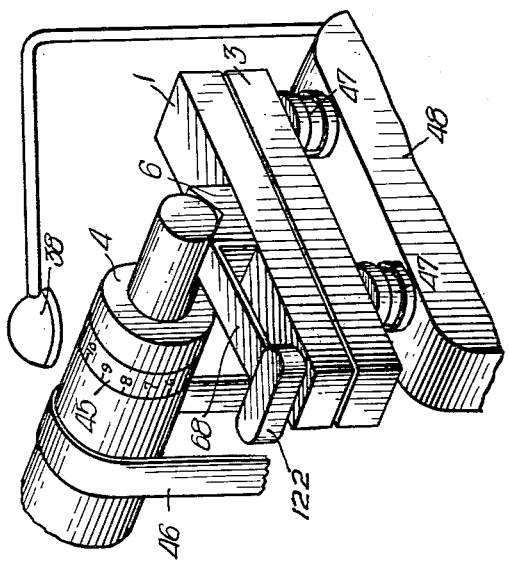
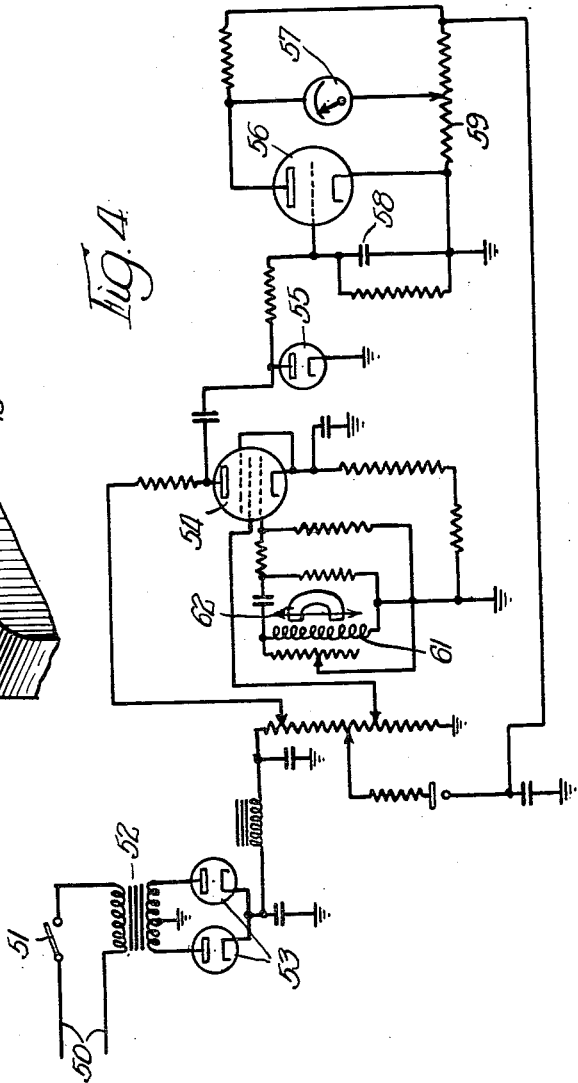
INVENTOR.
Clyde H Phelps,
BY April 28, 1964
C. H. PHELPS
3,130,588
BALANCE TESTING APPARATUS
Filed Sept. 24, 1959
8 Sheets-Sheet 3
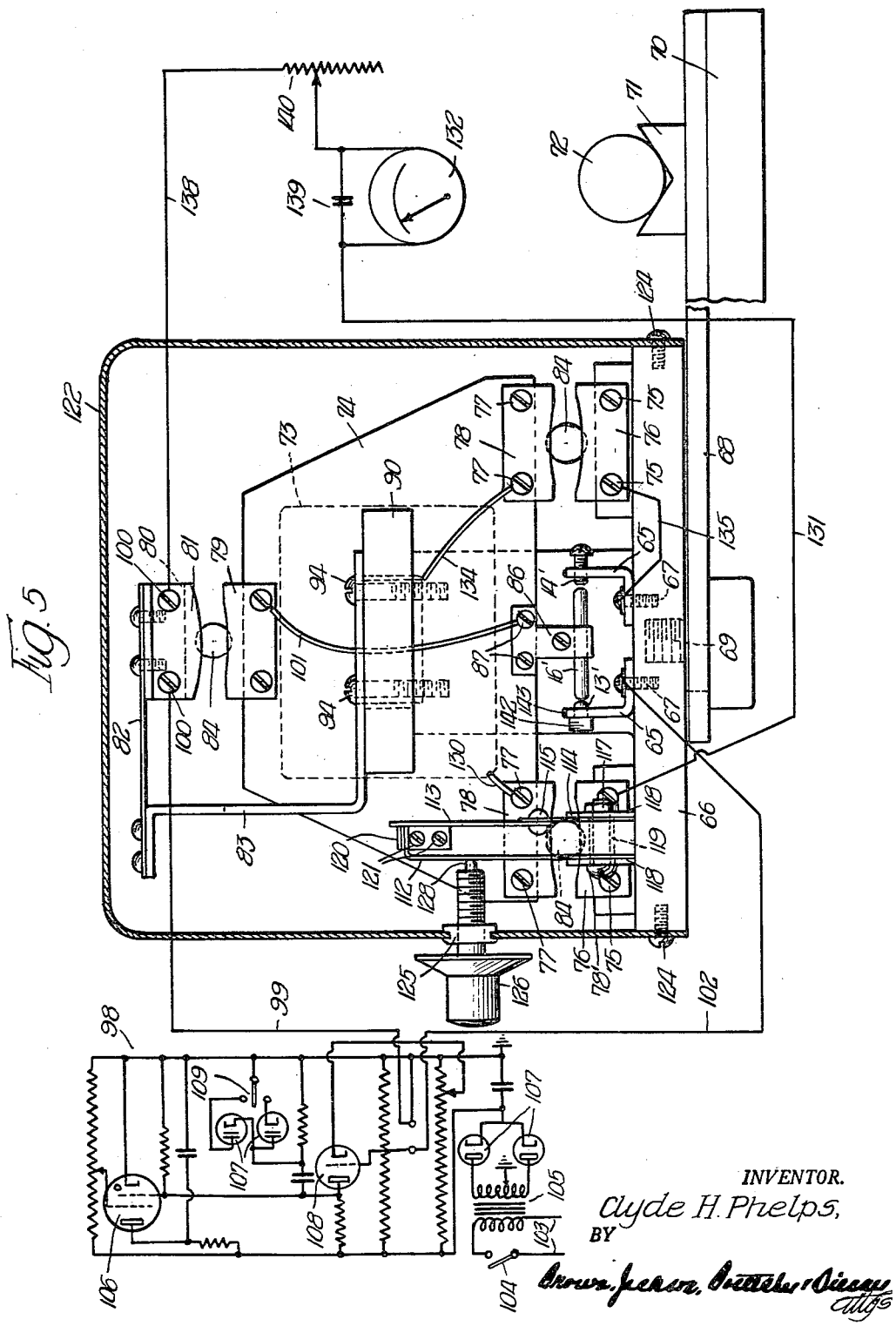
INVENTOR.
Clyde H. Phelps,
BY April 28, 1964　　　C. H. PHELPS　　　3,130,588
BALANCE TESTING APPARATUS
Filed Sept. 24, 1959　　　8 Sheets-Sheet 4

INVENTOR.
Clyde H. Phelps,
BY

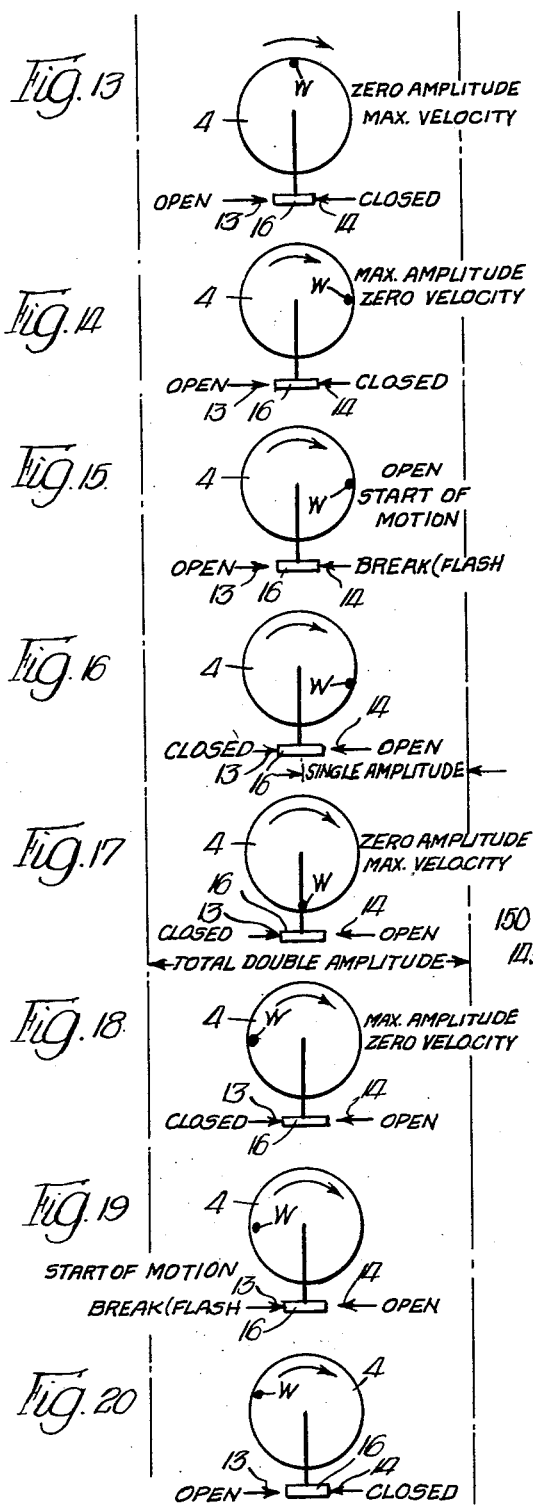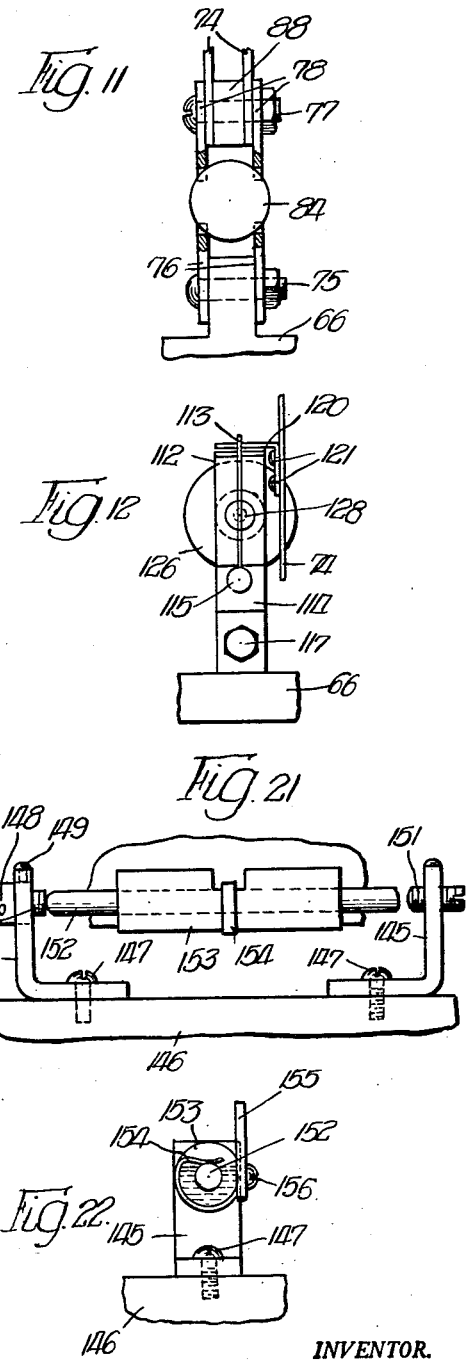

April 28, 1964  C. H. PHELPS  3,130,588
BALANCE TESTING APPARATUS
Filed Sept. 24, 1959  8 Sheets-Sheet 6
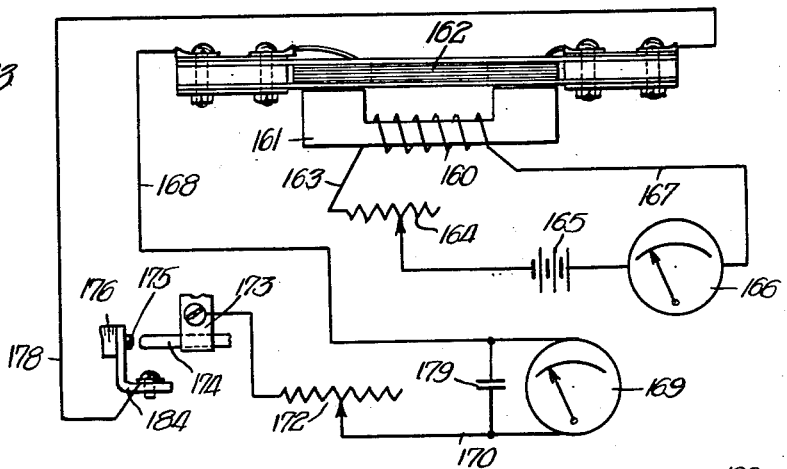
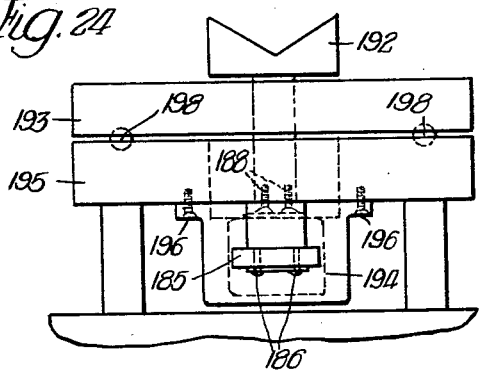
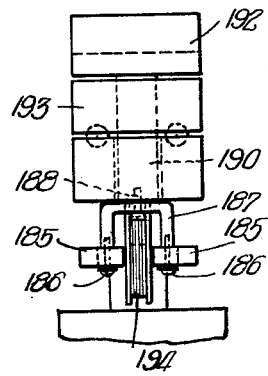
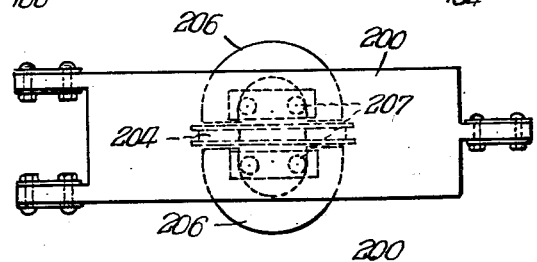
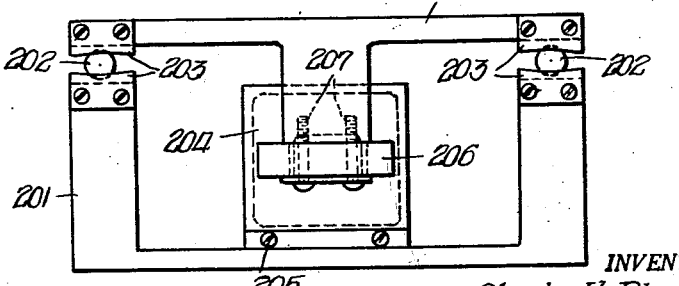
INVENTOR.
Clyde H. Phelps,
BY April 28, 1964     C. H. PHELPS     3,130,588
BALANCE TESTING APPARATUS
Filed Sept. 24, 1959     8 Sheets—Sheet 7
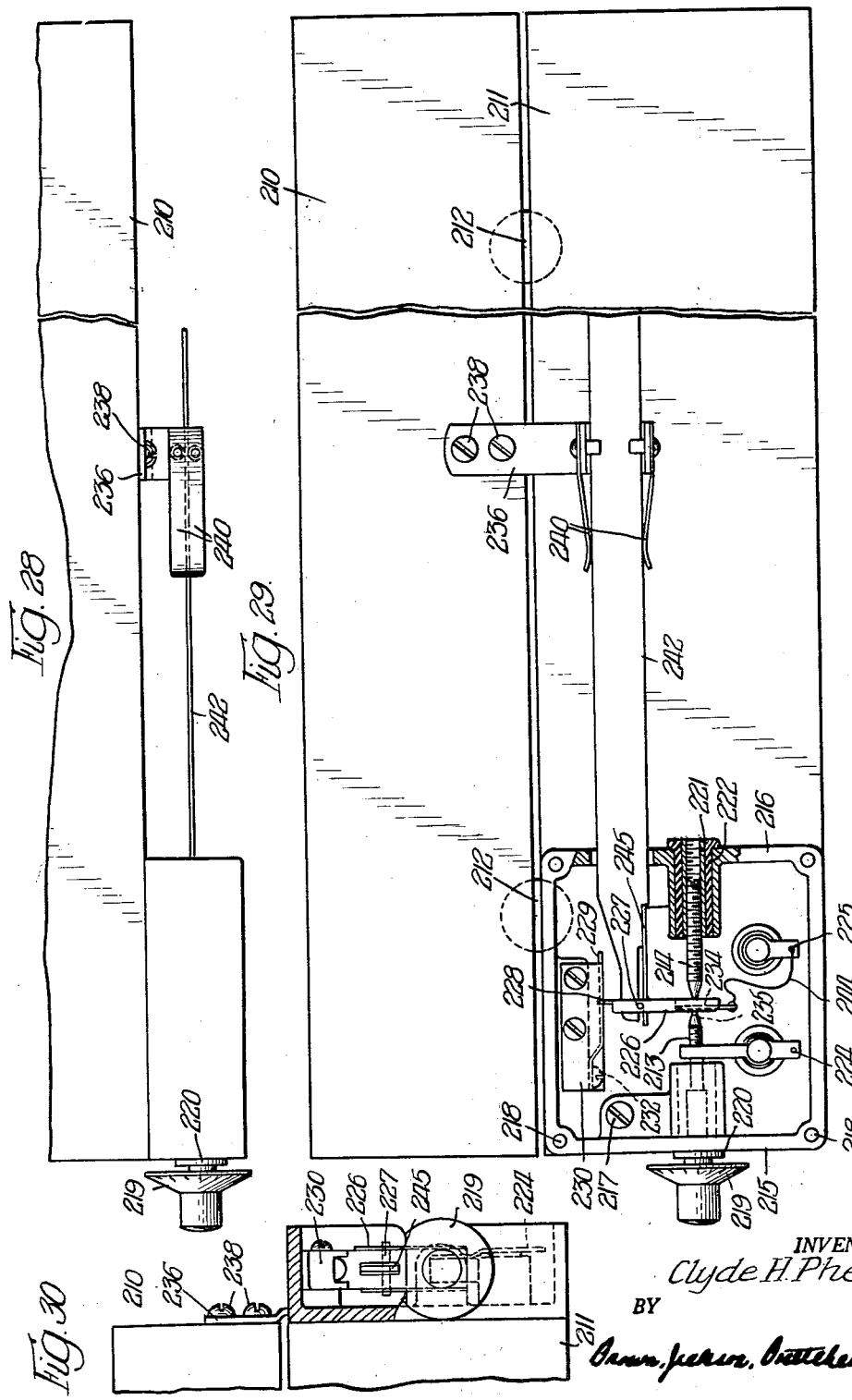
INVENTOR.
Clyde H. Phelps,
BY April 28, 1964   C. H. PHELPS   3,130,588
BALANCE TESTING APPARATUS
Filed Sept. 24, 1959   8 Sheets-Sheet 8
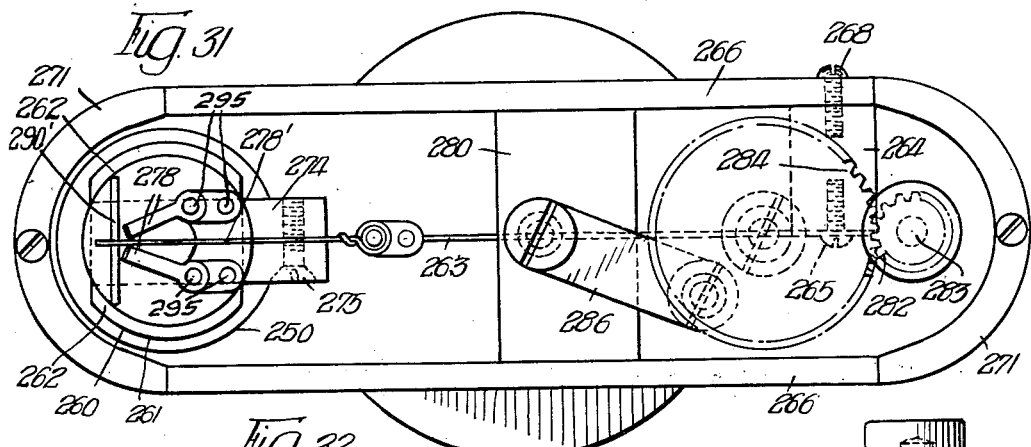
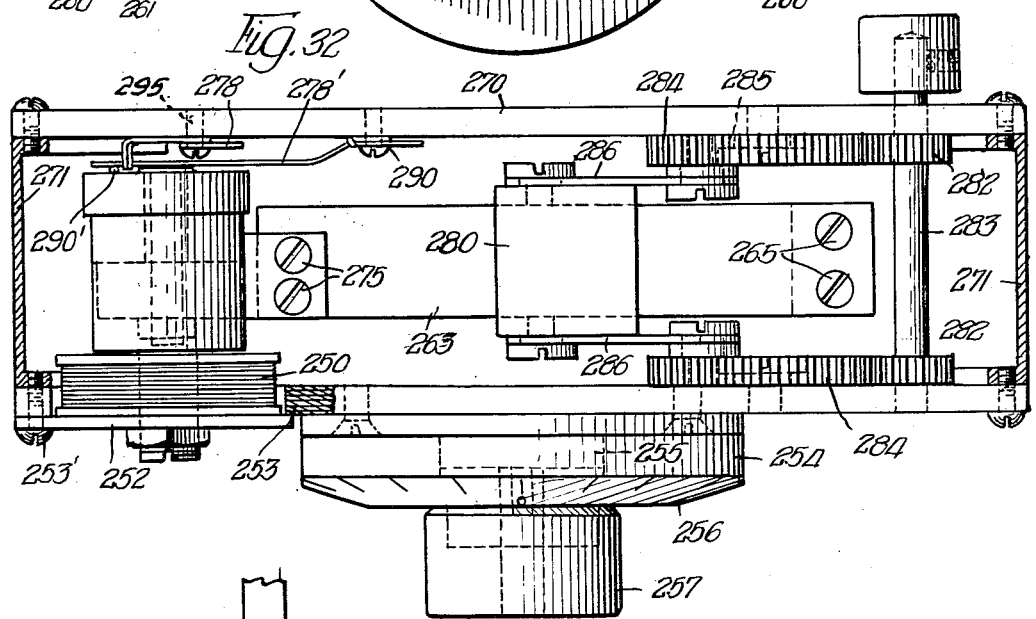
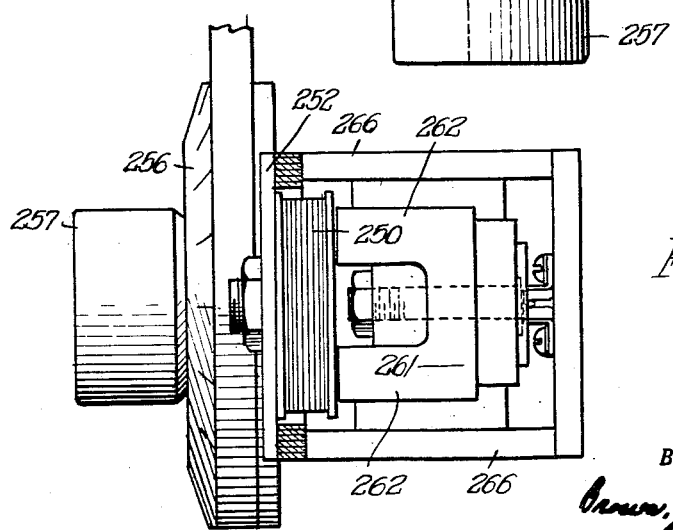
INVENTOR.
Clyde H Phelps,
BY

United States Patent Office 3,130,588
Patented Apr. 28, 1964

3,130,588
BALANCE TESTING APPARATUS
Clyde H. Phelps, Springfield, Ill., assignor, by mesne assignments, to Hanchett Manufacturing Company, Big Rapids, Mich., a corporation of Michigan
Filed Sept. 24, 1959, Ser. No. 842,137
5 Claims. (Cl. 73—466)

This invention relates, in general, to balance testing apparatus, and has particular relation to the running balance testing of large, heavy rotors, such as are used in steel, paper and pulp mills, railroad diesel generator armatures, electric power turbine rotors, large motor and generator armatures, etc., specifically elongated rolls, such as paper machine and printing press rolls, some of which are fifteen to thirty feet in length and only a few inches in diameter. Many of such rotors weigh several tons.

With unbalance of several hundred pounds, because of the great mass involved and the very large amounts of unbalance present, this, together with the flexibility of the elongated type of rotor, which must be balanced before "whip" or deflection occurs, demands low speed rotation, as the centrifugal force due to unbalance increases as the square of speed, large destructive forces can be set up with higher rotational speeds. Therefore, a low safe rotation speed for balance testing is highly desirable.

The broad concept of the present invention resides in the provision of balance testing apparatus for balance testing of such rotors over any desirable speed range and for providing indications of the angular position and value of unbalance, substantially independent of rotational speed, such that the major unbalance can be corrected at a very low safe speed, and then the speed may be increased with safety on up to any desired operational speed, with consistent unbalance indications at all speeds.

While the present apparatus is particularly adapted to the heavy type of rotor above described, it has equal merit in the balance testing of smaller rotors.

The device of the present invention is small in physical size and weight, and is inexpensive and simple of construction, yet rugged and durable in operation and can be adapted or attached to many present balance testing machines which provide motion in a restricted plane of vibratory motion, such as the horizontal or vertical planes.

The present device may be positioned and secured to the present balance testing machines, such that the oscillations through the horizontal plane due to unbalance are transferred to the device, whereby it will function as a seismic, space-mounted unit operated by inertia forces, or it may be so attached to a present balance testing machine, such that the actual oscillations drive the device with respect to a static, stationary mounting for the device.

As most balance testing machines have a pre-determined natural frequency, normally as low as the structure permits, the present device may be made to match or equal this frequency, such that the machine and the device of the present invention will always be in step or operating at the same point above or below or at the natural machine mounting frequency; or the device may be arranged for operation with infinite or straight line characteristics for operation by driving along a straight line path by the oscillations caused by unbalance when connected with a balance testing machine.

In balance testing operations, most machines are arranged for oscillations or vibrations to take place through the horizontal plane, and are restrained or restricted to oscillation or vibration through the vertical plane. While the present device can be arranged for operation in other planes, the accompanying drawings and specification will show, describe and explain the operation as related to vibration or oscillation through the horizontal plane.

As the vibration being considered is through the horizontal plane, it is a well-known fact that the amplitude of vibration through this plane simply describes a straight line of a length equal to the amplitude of vibration, and the distance from the center of this line to either end defines the value of the single amplitude.

The device of the present invention operates to open a set of contacts at the start of the amplitude travel from the extreme end of the total travel or point of greatest displacement. When these contacts open, they flash a stroboscopic light.

Below the resonance point the flashing of the stroboscopic light indicates the heavy spot of the rotor. Above the resonance point the flashing of the stroboscopic light indicates the light spot of the rotor. At exactly resonance, i.e., when the rotational frequency and the natural frequency are equal, there is a phase lag of 90°. Since the speed of the machine and the resonance point, and other factors are known, the flashing of the stroboscopic light gives an indication for determining the position of unbalance regardless of whether the machine is operating below the resonance point, or above the resonance point, or at the resonance point.

Therefore, when the stroboscopic contacts open, they flash a stroboscopic light, indicating, with the known factors taken into consideration, the angular position of unbalance on a suitable index band or marking around the rotor. This set of contacts remains open for slightly more than 180 degrees of rotor rotation, while a second contact closes and remains closed for slightly less than 180 degrees of rotation.

The second set of contacts serves the function of a rectifier, as they are series connected with a coil of wire disposed for relative motion equal to the amplitude of vibration, between the poles of a pair of powerful magnets, and thus a voltage proportional to the amplitude is set up within the coil, which is also series connected with a D.C. meter shunted by a large capacitor. Therefore, because these second contacts close the coil-meter circuit for a time period when the coil voltage is of one polarity and open the circuit when the polarity reverses, there remains a charge, of this one direction of flow, across the D.C. meter and its capacitor, indicative of the value of unbalance.

Because of the unique construction of the device of the present invention, there is provided means automatically to open a circuit at the precise instant motion caused by unbalance starts in one direction, regardless of the amplitude of motion. Thus, a dependable angular indication of the unbalance point can be obtained, as the contacts function at substantially zero current in controlling the associated electronic circuit containing the stroboscopic light; while the second contact system, acting as a rectifier, carries only the low voltage current generated by the coil-magnet combination to the high capacity condenser across the high resistance meter, such that a great number of half-wave voltage pulses can be stored in the high value capacitance across the meter resistance, which also tends to dampen the meter pointer for very slow speed balance operation.

Because of the powerful magnets, larger voltages than full-scale of the meter will be generated. Therefore, a suitable variable series resistor is preferably used to adjust the full-scale meter reading as required to indicate the unbalance value in convenient full-scale units, such as 1–5–10, or more pounds of unbalance full-scale reading, or other calibrations, such as depth of drill, etc., may be made.

The present invention provides another means of indicating the amplitude of unbalance by a micrometer suitably marked, which serves to adjust one of the contacts. This provides an indication of the total double amplitude from one maximum in one direction to the maximum in the opposite direction—at this point a minute change in the micrometer setting stops the flashing stroboscope because of lack of contact make or break.

The micrometer contact provides the very desirable feature of adjustment of the contacts to establish a definite balancing tolerance such as .001 or .0001 inch of double amplitude. When this pre-set tolerance is reached, both meter and stroboscope are inactive, as the contacts are neither closing or opening, but remain open circuit.

A further unique feature of the device of the present invention is that the stroboscope can be adjusted to indicate value of unbalance as well as indicating the angular position of unbalance. This is accomplished by the micrometer contact by setting a contact space of a given amount of tolerance, say .0001 inch, which then means this contact will open at the start of the vibration amplitude, indicating unbalance position stroboscopically, but, this contact will not close until more than 180 degrees of rotation of the rotor, because of the pre-set tolerance space of the contacts. Therefore, by suitable switching provided, the stroboscope will flash on contact instead of break. The angular position of contact make will vary with the value of unbalance, because of the contact tolerance space, thus providing an indication of the value of unbalance stroboscopically.

Therefore, this new combination provides means independent of speed to indicate value and position of unbalance at very low rotational speeds below the practical operational frequency of the electronic-rectifier amplifier type of system, usually considered of little value below five cycles per second. It will be noted that this device will discharge the stroboscope at the start of the vibration amplitude, with vibration amplitude as small as the pre-set tolerance space which may be pre-set to small values of a few micro-inches, which setting will also serve for very large or maximum values of unbalance amplitude.

The inertia actuated system is adapted for selective plane balancing according to the teaching of my United States Patent No. 2,740,297, issued April 3, 1956, for "Balance Testing Means," as the device may be pivoted about its center, as will be hereinafter disclosed, presenting a plane of zero response normal to the path of travel of the ball race combination, as required in my aforementioned patent.

Either the coil or the magnets may be the stationary elements within the scope of the present invention, as long as there is relative motion between them.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a view showing one form of contact system embodying the present invention; also the related stroboscopic light circuit, the coil-magnet combination, and the coil-meter circuit;

FIGURE 2 is an end view of the contact system shown in FIGURE 1;

FIGURE 3 is a fragmentary perspective view showing one rotor mounting, stroboscopic light and index band arrangement;

FIGURE 4 is a circuit diagram of an electronic system which may be used to give an amplified meter reading of the generator voltage of the magnet-coil combination;

FIGURE 5 is a longitudinal section through the case of a structure embodying the present invention and showing the structure pivoted on the pick-up arm of a balance testing machine;

FIGURE 11 is an end view of one of the lower balls and the lower ball races for the coil assembly of FIGURE 5;

FIGURE 12 is an end view of the contact system shown toward the left hand end of the base in FIGURE 5;

FIGURES 13, 14, 15, 16, 17, 18, 19 and 20 are diagrammatic views showing a rotor of clockwise rotation free to oscillate through the horizontal plane; also the various positions of the unbalance weight in the rotation of the rotor and the relation of the contact system with respect thereto;

FIGURE 21 is a fragmentary view showing an alternate contact system with a preferred type of slider;

FIGURE 22 is an end view of the contact system shown in FIGURE 21;

FIGURE 23 is a view showing the alternate use of electromagnets and a circuit diagram therefor;

FIGURE 24 is a view showing the magnets and coil mounted on the working heads of a balance testing machine;

FIGURE 25 is an end view of the structure shown in FIGURE 24;

FIGURE 26 is a top view showing a vertical suspension of the generator assembly;

FIGURE 27 is a side view of the structure shown in FIGURE 26;

FIGURE 28 is a top plan view of another form of contact system and actuator bar arrangement therefor;

FIGURE 29 is a side view of the contact system shown in FIGURE 28;

FIGURE 30 is an end view partially in section of the structure shown in FIGURES 28 and 29;

FIGURE 31 is a top view showing another contact system and coil-magnet combination embodying the present invention;

FIGURE 32 is a side view of the structure shown in FIGURE 31 with the end caps in section; and FIGURE 33 is an end view partially in section of the structure shown in FIGURES 32 and 33.

Figure 6:
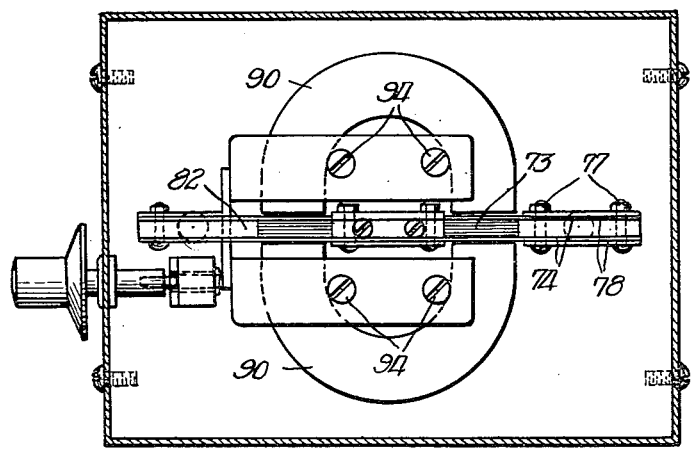
FIGURE 6 is a top view of the structure shown in FIGURE 5 with the case in horizontal section.
Figure 8:
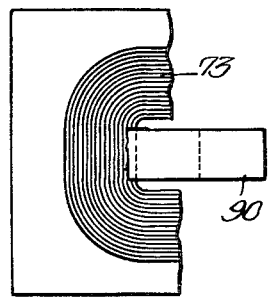
FIGURE 8 is a fragmentary sectional view showing the coil winding in relation to the magnet.

Referring first to FIGURE 1 of the drawings, the upper movable head of a balance testing machine is shown at 1. This head 1 moves, or oscillates, on balls 2 supported by the lower static head 3 of the balance testing machine. The axle or projecting end 4 of the rotor is supported, for example, in a V-block bearing support 6 mounted on the head 1 to turn about the axis of a depending pivot pin 7 which turns in an opening 8 in the head 1.

Attached to the static head 3 by screws 9 is a "Bakelite" or other suitable insulating member 10. At the ends of the member 10 are metal contact supports 11 attached to the member 10 by screws 12. A pair of screw contacts 13 and 14 are screwed or threaded through the supports 11 and supported thereby. The contact 13 is capable of adjustment and index calibration, such as a micrometer type screw with markings 15 capable of linear measurement. The other contact 14 may be either fixed or adjustable. Both contacts 13 and 14 are supported and isolated electrically by the insulating member 10.

The third contact 16 is in the form of a contact rod, common to contacts 13 and 14 and disposed endwise between the contacts 13 and 14 for relative movement with respect thereto. The contact 16 may be grounded or isolated electrically by insulation. The contact 16 is retained by a slider unit 17 comprising metallic sliders 18 lightly spring loaded to slide or travel along the oscillating contact 16 and make electrical contact therewith. Therefore, contact 16 and slider unit 17 may be at ground potential or isolated and wire connected. The friction between the sliders 18 and the contact rod 16 may be adjusted by a screw 19 and nut 20.

The sliders 18 carry the contact rod 16 and these elements float in space to oscillate between the contacts 13 and 14, since they are attached to the oscillating rotor support. The insulated support system, with screw contacts 13 and 14, is stationary, since they are attached to the static head 3 or non-oscillating rotor support system.

The coil-magnet combination comprises a coil 22 having relative motion equal to the amplitude of vibration between the poles of a pair of powerful magnets 23. Thus, a voltage proportional to the amplitude is set up within the coil 22, which is also series connected with a D.C. meter 24 shunted by a large capacitor 25. One terminal of coil 22 is connected by a conductor 26 to screw contact 13. The other terminal of coil 22 is connected to one side of the meter 24 by a conductor 27. The other side of the meter 24 is connected by a conductor 28 to the contact rod 16 through the slide unit 17.

A variable series resistor 30 is preferably provided to adjust the full-scale meter reading as required to indicate the unbalance value in convenient full-scale units, such as 1-5-10 or more pounds of unbalance full-scale reading, or other calibrations.

The sliders 18 are secured to the upper vibrating or oscillating head 1 for oscillation or vibration with this head longitudinally between the contacts 13 and 14. This is accomplished, for example, by providing the spring slider arms which contact the contact rod 16 and have sliding movement therealong with angular bases secured, for example, by means of screws 32 to the head 1.

A conventional stroboscopic circuit 33 is connected by conductors 34 and 35 across the contacts of the slider unit 17 and the contact 14. The stroboscopic circuit selected for illustration has an alternating current line 41, switch 36, constant voltage transformer 37, stroboscopic light 38, tube or tubes having two sets of elements 39, a three element tube 40, and a switch 42 adapted to be set to flash on make, or on break, or to eliminate the flash on both. In the stroboscope flashing circuit, initially disregarding any potential applied over conductor 35 to the grid of triode 40, the voltages applied to the cathode and control grid of tube 40 cause this tube to conduct. If the tube is then cut off, the rapid positive-going transition of its anode potential is differentiated across the RC circuit shown and utilized to provide a trigger pulse to flash stroboscope tube 38. When the tube is subsequently rendered conductive and its anode potential rapidly goes negative, this voltage change is also differentiated and similarly utilized to provide a firing pulse for the stroboscope. However, if it is desired to provide such pulses only responsive to tube cut-off or to tube conduction, the proper connection of switch 42 is utilized to shunt one or another of the flashing pulses to ground over one of diodes 39. Tube 40 is cut off as contact rod 16 is driven into engagement with contact 14, applying ground potential to the grid of tube 40 as a positive voltage is applied to its cathode. When contact 16 is later displaced from engagement with contact 14, the ground connection is removed and the potential applied to the grid of triode 40 goes positive relative to the cathode potential and causes the tube to again conduct to provide the requisite firing pulse at the control grid of stroboscope tube 38.

In use, the contacts 13 and 14 are adjusted until contact is established with contact rod 16, thus electrically connecting contacts 13, 14 and 16. The micrometer may then be adjusted to move contact 13 away from contact rod 16 an indicated amount. For example: .001 of an inch providing a total possible space between the contact 16 and either or both contacts 13 and 14; for example, if slider 13 and contact rod 16 move away from contact 14 .0005 of an inch, all contacts are open circuit.

An important characteristic of the contact system resides in the slider unit 17 and contact 16. The slider assembly 17 and contact 16 oscillate back and forth within the confines of the contacts 13 and 14. This is a very small travel or a very small part of the total oscillation to be indicated. Therefore, after contact 16 makes endwise contact with either, but not both, contact 13 or contact 14, the sliders 18 simply slide along contact 16 a distance equal to the amplitude in that direction, holding contact with contact 13, or contact 14, until the travel in that direction is completed. At that point, contact is broken because motion starts in the reverse direction.

Actually, this function is controlled by the frictional engagement of sliders 18 with the contact 16. The friction required for this function must equal at least the inertia force and momentum, or stored energy of contact 16, because of its acceleration and oscillation. However, because contact 16 has zero velocity at each end of its total travel, the maximum friction is obtained at these stopping points, where the instant reversal of motion takes place to open contact 13 or 14 and continues until the opposite contact is closed. At the time sliding friction starts, and accordingly lowers in value.

It is, therefore, desirable to keep the mass or weight of the sliders 18 and contact 16 very small, which is exactly the case in this device. Therefore, the require operational friction is negligible and may be disregarded in all but extremely light work. The friction device is selective or adjustable to suit the type of work to be done, as well as the physical size of all parts thereto.

When the contact system, magnetic generator comprising the coil 22 and magnets 23, and the electronic stroboscope are combined, and either the coil 22 or magnet 23 are mounted, for example, upon the curved thin ball raceways, as will hereinafter appear, the device becomes inertia operated with extremely low natural period, as controlled by the curvature of the thin ball races of very long radius. Thus, the equivalent of a pendulum from four to six feet in length is obtained, depending upon the curvature radius selected, and this is accomplished without springs.

FIGURES 13 through 20 show diagrammatically a rotor 4 of clockwise rotation free to oscillate through the horizontal plane, and the action of the contact 16 with respect to the contacts 13 and 14.

FIGURE 13 shows the position of unbalance weight W on the vertical center line of the rotor. At this weight position there is zero amplitude or displacement. However, contact 14 is closed because the direction of motion along the horizontal line is to the right, as weight W rotating clockwise was at the position shown in FIGURE 20 at a previous instant.

In FIGURE 14 the position of the weight W has reached its maximum amplitude in a direction to the right and its velocity in that direction is reduced to zero. Therefore, contact 14 is still closed.

In FIGURE 15 the position of weight W is substantially the same as shown in FIGURE 14, where the rotor has maximum displacement to the right—this is also the starting point of its excursion in the opposite direction (to the left) and it is this point where contact 14 opens, substantially, the instant after maximum amplitude or displacement in that direction. The opening of contact 14 energizes the stroboscope to indicate the position of unbalance.

FIGURE 16 shows weight W in a position causing motion to the left, closing contact 13 and connecting the magnetic generator comprising coil 22 and magnets 23 into circuit with the meter 24.

FIGURE 17 shows weight W in its mid-travel position with contact 13 still connected in the meter circuit. At this point the velocity is maximum. Accordingly, maximum voltage is generated and trapped in the capacitor 25 at this point.

FIGURE 18 shows weight W in its maximum position to the left, with contact 13 still closed.

FIGURE 19 is substantially the same as FIGURE 18. However, at this point, instantly following maximum amplitude, the motion starts in the opposite direction and opens contact 13, which is in series circuit relation with the magnetic generator 22, 23 and meter capacitor 24, 25 combination. Thus, a voltage of one polarity only is impressed across the meter capacitor 24, 25 and as the voltage of either half cycle is similar, a voltage proportional to the amplitude of motion is indicated on the meter 24.

FIGURE 20 shows the weight W in position to close contact 14 and start another cycle of amplitude. Either set of contact points may be switch-connected to control either the stroboscope or the meter circuit.

From the foregoing, it will be apparent that contact 14 opens at the instant motion of the rotor or body 4 caused by unbalance starts in one direction, and that this opening of the circuit at contact 14 flashes the stroboscopic light 38 and indicates the position of unbalance. The coil-meter circuit is closed at the other contact 13 and the meter 24 is thus operated in accordance with the value of unbalance.

FIGURE 3 shows the rotor 4 supported in the V-bearing 6 on the upper movable head 1 which oscillates on balls operating on curved ball raceways as will presently appear. The stroboscope light is shown at 38, and an index band is shown on the rotor at 45. A belt is shown at 46 for turning or driving the rotor 4. Levelling devices 47 are shown between the lower static head 3 and the pedestal 48 for levelling the head 3.

The electronic system shown in FIGURE 4 for giving an amplified meter reading of the generator voltage of the magnet 23, coil 22 combination has an alternating current line 50, a switch 51, a constant voltage transformer 52, a tube or tubes having two sets of elements 53, a five element tube 54, a two element tube 55, and a three element tube 56. The meter 57 is connected as an unbalance sensing element in a bridge arrangement of which two legs are provided by portions of variable resistor 59, a third leg is provided by the effective impedance of tube 56, and the fourth leg is provided by a resistor connected between the anode of tube 56 and one end of variable resistor 59. The coil-magnet combination in which the coil and magnet have relative movement to set up a voltage within the coil proportional to the amplitude of oscillation is shown at 61, 62. Relative displacement of coil 61 with respect to magnet 62 induces a voltage in coil 61 which is applied to the input circuit of tube 54, in which it is amplified and the amplified signal is transmitted to the grid leak circuit of triode 56, including capacitor 58 and a parallel-connected resistor, effecting a change in the conduction of this tube. As the conduction level of triode 56 changes, its effective impedance is also changed to provide an unbalance in the bridge circuit across which meter 57 is connected. Accordingly the pointer on meter 57 is deflected to indicate the extent of the unbalance, providing a visible indication of the relative movement between coil 61 and magnet 62.

In the embodiment of the invention illustrated in FIGURES 5 through 12, the angle brackets 65 through which the screw contacts 13' and 14' are screwed or threaded are fastened to a base 66 by screws 67.

The base 66 is pivoted about its center on a pick-up bracket arm 68 by a pivot screw 69. The arm 68 is attached to the top head 70 of a balance testing machine for vibration or oscillation therewith. The head 70 has a V-block bearing support 71, which supports the rotor or a projecting end or axle 72 thereof.

Figure 7:
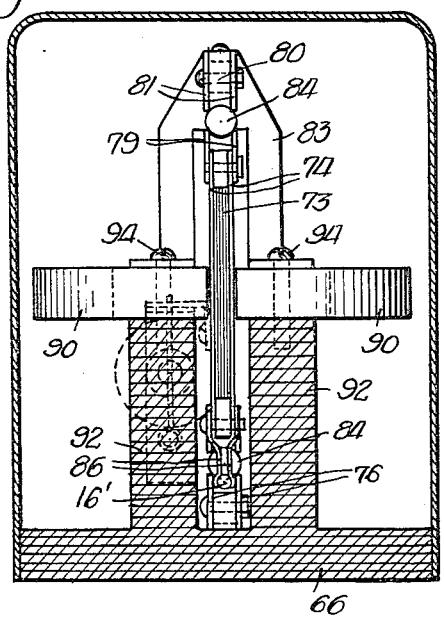
FIGURE 7 is an end view of the structure shown in FIGURE 5 with the case and base in vertical section.

The coil 73 of the coil-magnet combination is wound between a pair of side members 74 of the coil assembly, and is related to the magnet, as shown in FIGURE 7.

Attached to the base 66 by screws 75 are two pairs of thin ball races 76. Attached by screws 77 to the bottom of the coil assembly are a pair of thin complementary ball races 78. Attached to the top of the coil assembly and particularly to the side members 74 thereof is a pair of thin ball races 79, and attached to insulating spacer 80 is a pair of thin ball races 81 complementary with respect to the ball races 79. The spacer 80 is attached to a spring 82 carried by a bracket or clamp 83.

Balls 84 are retained and act between the races 76 and 78, and between the races 79 and 81, and the device thus becomes inertia operated with extremely low natural period, as controlled by the curvature of the thin ball races. The curvatures of these races which cooperate with the balls 84 are of very long radius, such that the equivalent of a pendulum from four to six feet in length is obtained, depending upon the curvatures selected. Attention in the foregoing respects is directed to United States Patent No. 2,754,686, issued July 17, 1956, for Support Means for Balancing Machines.

Figure 9:
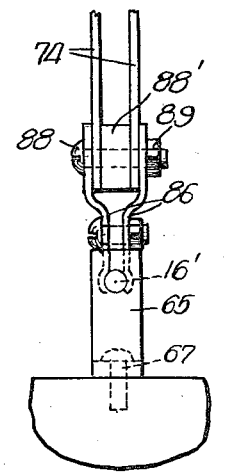
FIGURE 9 is an end view of the contact system shown in FIGURE 5.
Figure 10:
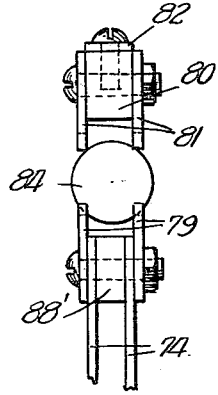
FIGURE 10 is an end view of the upper ball and ball races for the coil assembly of FIGURE 5.

The contact rod 16', which oscillates endwise between the screw contacts 13' and 14' is retained by a slider unit comprising sliders 86 fastened to the coil assembly by screws 87, as shown in detail in FIGURES 5 and 9. The friction between the sliders 86 and the contact rod 16' may be adjusted by a screw 88 and nut 89.

The contact 13' is capable of adjustment and index calibration as previously described.

The coil 73 has relative movement between the poles of a pair of powerful magnets 90 fastened with the bracket or clamp 83 to upright portions 92 of the base 66 by screws 94.

One side of the stroboscopic circuit 98 is connected by a conductor 99 to a screw 100 fastening the races 81 to the spacer 80, and through the races 81 and 79 and a conductor 101 to the slider 86 and contact rod 16'. The other side of the stroboscopic circuit is connected by a conductor 102 to the screw contact 13' through the related screw 67 and bracket 65.

The stroboscopic circuit 98 has an alternating current line 103, switch 104, constant voltage transformer 105, stroboscopic light 106, tube or tubes having two sets of elements 107, a three element tube 108, and a switch 109 adapted to be set to flash on make or break or to eliminate the flash on both.

A leaf spring 112 and contactor assembly (consisting of hair-like contactor 113 secured to leaf spring 114 by a rivet 115) are fastened to base 66 by a screw 78' and nut 117. These parts are insulated with insulators 118 and an insulating tube 119. Also, angle contact spring 120 is fastened to the coil assembly 74 by screws 121.

Case 122 is secured to the base 66 by screws 124. Nut 125 is riveted to case 122 and knurled adjusting screw 126 is threaded through the nut 125. An insulated pin 128 is cemented in adjusting screw 126.

One terminal 130 of the coil 73 is connected to screw 77 and through races 78 and 76 and a conductor 131 to one side of the meter 132. The other terminal 134 of the coil 73 is connected through the other races 78 and 76 and a conductor 135 to the screw contact 14' through the bracket 65 therefor. The other side of the meter 132 is connected by a conductor 138 to the other screw 100 and through the races 81 and 79 and conductor 101 to the slider 86. The meter 132 is shunted at 139 by a capacitor and a variable series resistor 140 is provided for the purpose previously described.

Micrometer assembly at 142 is secured to the adjacent angle bracket 65 by a screw 143. Contact screw 13' is screwed in angle bracket 65 as previously described.

With the foregoing arrangement, the angle contact spring 120 has relative movement with relative movement of the coil assembly with respect to the magnets 90, and thus opens and closes the circuit at the leaf spring 112 and hair-like contactor 113 to provide an unbalance indication as a function of relative movement between the coil and magnet elements for use in associated equipment such as that described in my above-identified Patent No. 2,740,297.

In the alternate contact system shown in FIGURES 21 and 22 with the preferred type of slider, the angle brackets 145 are attached to the base 146 by screws 147. Micrometer assembly 148 is secured to the angle bracket 145 by screw 149. Contact screw 150 is screwed into the adjacent bracket 145, and the other contact screw 151 is screwed into the other bracket 145. Contact rod 152 is retained by an insulated slider 153 and friction is controlled by a spring 154. Insulated slider 153 is fastened to the coil assembly 155 by screws 156.

FIGURE 23 shows the alternate use of electromagnets and the circuit therefor. While two electromagnets are preferably employed, only one is shown. It comprises a coil 160 and a magnetic core 161 having poles presented to the coil 162, it being understood, as before, either the coil 162 or the electromagnet may be the stationary element as long as there is relative motion between them, for example, in the manner and for the purpose previously described.

One end of the coil 160 of the electromagnet is connected through a conductor 163, variable resistor 164 and battery 165 to one side of meter 166. The other terminal of the coil 160 is connected through a conductor 167 to the other side of the meter 166. One terminal of the coil 162 is connected by a conductor 168 to one side of a meter 169. The other side of the meter 169 is connected by a conductor 170 and through a variable series resistor 172 to the slider 173 for contact rod 174. Contact screw 175, with its micrometer assembly 176 is connected by a conductor 178 to the other terminal of the coil 162. The meter is shunted by a large capacitor 179. The contact screw 175 is screwed in a bracket 184 fastened, for example, to the base as previously described.

FIGURES 24 and 25 show the magnets 185 fastened by screws 186 to a bracket 187, which is fastened by screws 188 to the pin 190 of the V-block bearing support 192. The magnets 185 are thus mounted for vibration or oscillation with the top head 193 of a balance testing machine. The coil 194 is fastened to the bottom static head 195 of the balance testing machine by screws 196. Of course, the magnets may be mounted on the bottom head, and the coil on the top head, as desired. The top head 193 oscillates on balls 198 which operate in ball races as previously described.

FIGURES 26 and 27 show a vertical suspension of the generator assembly. The top head 200 of the balance testing machine oscillates or vibrates on the lower static head 201 through balls 202 which operate in races 203 as previously described. The coil 204 is mounted at 205 on the static bottom head or part of the machine, and the magnets 206 are fastened at 207 to the top head 200 for oscillation therewith, and therefore have relative movement with respect to the coil 204.

In the embodiment of the invention illustrated in FIGURES 28, 29 and 30, the oscillating top head of balance testing machine is shown at 210, and the static bottom head shown at 211. The top head 210 vibrates, or oscillates, on balls 212, which operate on ball races as previously described.

Contact screws 213 and 214 are mounted in opposite walls 215 and 216 of a box-like structure fastened to the bottom head at 217. The box-like structure is provided with a cover (not shown) which may be secured in place by screws engaging in threaded holes 218. The contact 213 has a dial 219 and constitutes a calibration screw contact mounted in a contact sleeve 220. The contact 214 is mounted in an adjusting screw sleeve 221 surrounded by a "Bakelite" or other suitable insulating sleeve 222.

Terminals are provided at 224 and 225, and contact pivot plate 226 is pivoted at 227. The plate 226 has knife edge engagement at 228, and is spring loaded by a pivot retaining spring 229 fastened to the pivot block 230 by a screw 232. A contact plate is provided at 234 for oscillation between and contact with the contacts 213 and 214, and an insulator is provided at 235.

A drive bracket 236 is fastened to the top head 210 by screws 238 and friction drive spring means 240 is connected to the bracket 236 for oscillation therewith. The friction drive spring means 240 frictionally retains an actuator bar 242 for oscillating or vibrating the bar, and for movement relative thereto as previously described in connection, for example, with the contact rod and slider arrangement shown in FIGURE 5. The actuator bar is oscillated by oscillation of the head 210, and oscillates the contact plate 234 between the contacts 213 and 214 and into engagement therewith.

The contact plate 234 is connected to the terminal 225 by a conductor 244. The remaining circuit may, for example, be as shown and described in connection with FIGURES 1 or 5.

In the embodiment of the invention illustrated in FIGURES 31, 32 and 33, the coil 250 is mounted on a mounting plate 252 fastened to the "Bakelite" or other suitable base or bottom 253, for example, by screws 253'. The base 253 is provided with a pick-up bracket arm 254 by a pivot pin 255. The arm 254 may be attached to the oscillating head of the balance testing machine for oscillation therewith as previously described. A dial is provided at 256. A lock nut is provided at 257.

A U-shaped magnet 260 has a cylindrical base 261 and legs 262 provided with poles presented to the coil 250. An inertia spring 263 is fastened at one end to a spring bracket 264 by a screw 265. The bracket 264 is fastened to one of the side plates 266 by a screw 268. A "Lucite" or other suitable top, preferably transparent, is provided at 270. End caps are provided at 271. The opposite end of the inertia spring 263 has a magnet bracket 274 fastened to the spring by screws 275. The bracket 274 engages between the legs of the U-shaped magnet 260 for producing relative movement between the magnet 260 and the coil 250 by vibration or oscillation of the pick-up arm 254. Thus, a voltage is set up within the coil 250 proportional to the amplitude of oscillation.

A pair of contacts 278 are arranged to contact a contact reed 278' fixed in place at 290 as shown to control the circuits as previously described. Contacts 278 are fixed in place at 295. Relative motion between the contacts 278 and the contact reed 278' is produced by a driver 290' which drives the contact reed 278' from the magnet 260 and with respect to the contacts 278 for make and break contact therewith. The contacts 278 are shown as having a fixed gap therebetween, but the gap may be made adjustable for adjustment in the manner previously set forth.

A slider 280 is movable along the inertia spring 263 for varying the frequency of the spring as desired. Pinions 282 on a shaft 283 mesh with gears 284 which turn on bearing screws 285. Connecting rods 286 pivotally connected at their opposite ends to the gears 284 and to the slider 280 move the slider 280 along the inertia spring by turning the shaft 283 by a knob 288.

The circuits for the embodiment of the invention illustrated in FIGURES 31, 32 and 33 may be as previously described.

The embodiments of the invention disclosed in the drawings and the specification are for illustrative purposes only, and it is to be expressly understood that said drawings and the specification are not to be construed as a definition of the limits or scope of the invention, reference being had to the appended claims for that purpose.

I claim:

1. In a balance testing apparatus, in combination, an upper movable head having planar oscillation relative to a lower static head by unbalance in a rotary body, a pair of static contacts carried by said lower static head and spaced apart in the direction of planar oscillation of said upper head, a slider unit carried by said upper head for planar oscillation therewith, a contact rod carried by said slider unit for movement into contact with one of said static contacts and out of contact with the other static contact by planar oscillation in one direction and out of contact with said one static contact and into contact with said other static contact by planar oscillation in the opposite direction, a stroboscopic circuit connected across said contact rod and one of said static contacts and including a stroboscopic indicating light, said stroboscopic light being energized to give an indication for determining the position of unbalance by movement of said contact rod out of contact with said static contact, a coil-magnet combination having the coil thereof connected across said contact rod and the other static contact, said coil-magnet combination being disposed for relative motion between the coil and magnet to induce a voltage within said coil proportional to the amplitude of oscillation, and a meter connected in circuit with said coil.

2. Balance testing apparatus according to claim 1, wherein the slider unit has frictional engagement with the contact rod for actuating said rod into contact with one static contact upon movement in one direction and for actuating said contact rod into contact with the other static contact upon movement in the opposite direction, and wherein the slider unit has sliding movement along the contact rod a distance equal to the amplitude of oscillation while holding the contact rod in contact with the static contact with which it is engaged.

3. Balance testing apparatus according to claim 1, wherein the slider unit includes a conducting portion having electrical contact with the contact rod.

4. Balance testing apparatus according to claim 1, wherein the static contact, across which and the contact rod the coil of the coil-magnet combination is connected, is capable of adjustment and index calibration.

5. Balance testing apparatus according to claim 1, wherein the static contacts are in the form of screw contacts threaded through metal contact supports attached to an insulating member attached to the lower static head.

References Cited in the file of this patent

UNITED STATES PATENTS

| | | |
|---|---|---|
| 2,165,024 | Baker et al. | July 4, 1939 |
| 2,289,200 | Lundgren | July 7, 1942 |
| 2,301,291 | Kolesnik | Nov. 10, 1942 |
| 2,328,114 | Weaver et al. | Aug. 31, 1943 |
| 2,363,303 | Ehrgott et al. | Nov. 21, 1944 |
| 2,449,651 | Hathaway | Sept. 21, 1948 |
| 2,521,141 | Allan | Sept. 5, 1950 |
| 2,616,288 | Mesa | Nov. 4, 1952 |
| 2,722,828 | Holaday et al. | Nov. 8, 1955 |
| 2,754,686 | Phelps | July 17, 1956 |
| 2,773,389 | King | Dec. 11, 1956 |
| 2,806,196 | Koppelmann | Sept. 10, 1957 |
| 2,947,174 | Lash | Aug. 2, 1960 |

OTHER REFERENCES

Pages 55, 56 of Elements of Mechanical Vibrations, by Freberg and Kemler, published by Wiley, 1947.